US008274513B1

(12) United States Patent
Ubieto

(10) Patent No.: US 8,274,513 B1
(45) Date of Patent: Sep. 25, 2012

(54) SYSTEM, METHOD, AND COMPUTER PROGRAM PRODUCT FOR OBTAINING A BOUNDARY ATTRIBUTE VALUE FROM A POLYGON MESH, DURING VOXELIZATION

(75) Inventor: Ignacio Llamas Ubieto, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1097 days.

(21) Appl. No.: 11/958,273

(22) Filed: Dec. 17, 2007

(51) Int. Cl.
*G06T 17/00* (2006.01)
(52) U.S. Cl. ........................................ 345/424
(58) Field of Classification Search ............. 345/424
See application file for complete search history.

(56) References Cited

U.S. PATENT DOCUMENTS

| | | | | |
|---|---|---|---|---|
| 6,556,199 | B1 * | 4/2003 | Fang et al. | 345/424 |
| 6,559,843 | B1 * | 5/2003 | Hsu | 345/421 |
| 6,608,627 | B1 * | 8/2003 | Marshall et al. | 345/619 |
| 7,023,435 | B1 * | 4/2006 | Litke et al. | 345/420 |
| 2004/0179010 | A1 * | 9/2004 | Wittenbrink et al. | 345/440 |
| 2005/0162418 | A1 * | 7/2005 | Kase | 345/419 |
| 2006/0028468 | A1 * | 2/2006 | Chen et al. | 345/424 |
| 2006/0087509 | A1 * | 4/2006 | Ebert et al. | 345/473 |

OTHER PUBLICATIONS

Fang, S. et al., "Hardware Accelerated Voxelization," Computers and Graphics, 2000, vol. 24, No. 3, pp. 433-442.
Haumont, D. et al., "Complete Polygonal Scene Voxelization," Journal of Graphics Tools, 2002, vol. 7, No. 3, pp. 27-41.
Li, W. et al., "GPU-Based Flow Simulation with Complex Boundaries," 2003, pp. 1-8.
Dong, Z. et al., "Real-time Voxelization for Complex Models," Pacific Graphics, 2004, pp. 1-9.
Hsieh, H.-H. et al., "A Flexible 3D Slicer for Voxelization Using Graphics Hardware," Association for Computing Machinery, Inc., 2005, pp. 285-288.
Eisemann, E. et al., "Fast Scene Voxelization and Applications," ACM SIGGRAPH Symposium on Interactive 3D Graphics and Games, 2006, pp. 71-78.
Passalis et al., "General Voxelization Algorithm with Scalable GPU Implementation," Mar. 1, 2006, pp. 1-9.
Erleben, K. et al., "Signed Distance Fields Using Single-Pass GPU Scan Conversion of Tetrahedra," GPU Gems 3, Aug. 12, 2007, Chapter 34, pp. 741-763.

* cited by examiner

*Primary Examiner* — Edward Martello
(74) *Attorney, Agent, or Firm* — Zilka-Kotab, PC

(57) ABSTRACT

A system, method, and computer program product are provided for obtaining a boundary attribute value from a polygon mesh, during voxelization. In operation, voxelization is performed. Furthermore, during the voxelization, a boundary attribute value is obtained from a polygon mesh. Additionally, the boundary value includes a value of a boundary attribute of an object that is capable of being linearly interpolated across a boundary of a polygon mesh.

23 Claims, 8 Drawing Sheets

US 8,274,513 B1

SYSTEM, METHOD, AND COMPUTER PROGRAM PRODUCT FOR OBTAINING A BOUNDARY ATTRIBUTE VALUE FROM A POLYGON MESH, DURING VOXELIZATION

FIELD OF THE INVENTION

The present invention relates to graphics techniques, and more particularly to voxelization.

BACKGROUND

Recent systems have performed voxelization on graphics hardware to obtain both boundary and solid volumetric representations. For fluid simulation purposes, both solid and boundary voxelizations are typically needed to determine whether a cell in the simulation domain is inside or outside an obstacle and what velocity the obstacle has at its boundary. To date, there has been a void of solutions to obtain a volumetric representation of boundary attributes (e.g. velocity, etc.) or solutions that operate at real-time rates in graphics processor architectures to generate desired information.

There is thus a need for addressing these and/or other issues associated with the prior art.

SUMMARY

A system, method, and computer program product are provided for obtaining a boundary attribute value from a polygon mesh, during voxelization. In operation, voxelization is performed. Furthermore, during the voxelization, a boundary attribute value is obtained from a polygon mesh.

DETAILED DESCRIPTION

Figure 1:
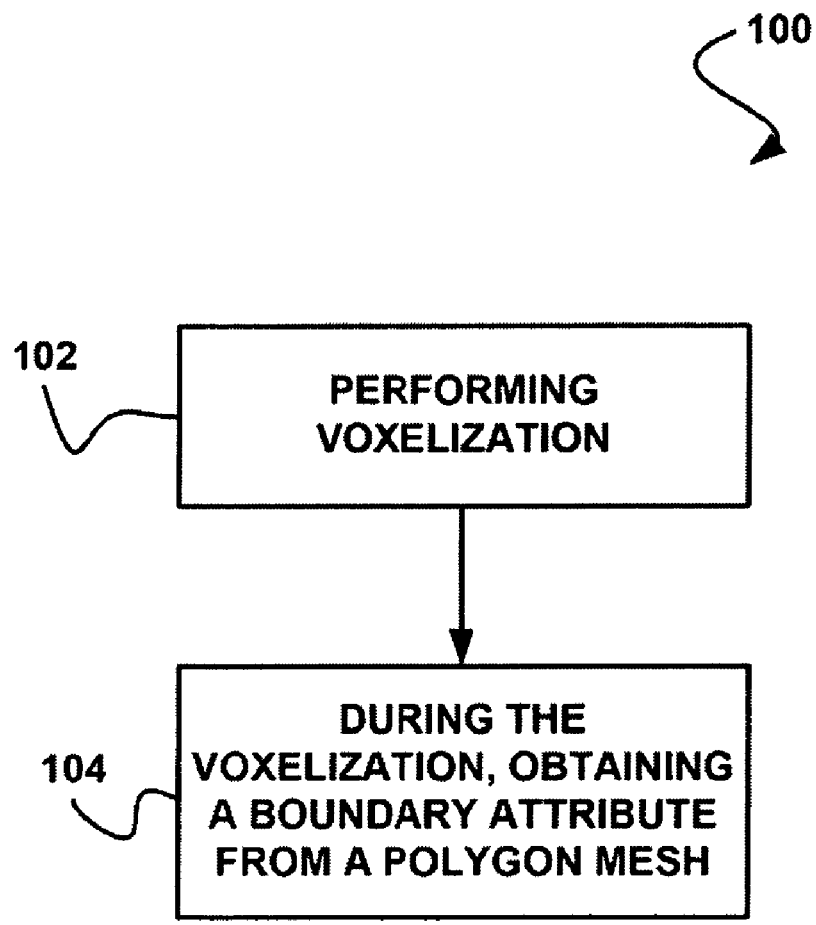
FIG. 1 shows a method for obtaining a boundary attribute value from a polygon mesh during voxelization, in accordance with one embodiment.

FIG. 1 shows a method 100 for obtaining a boundary attribute value from a polygon mesh during voxelization, in accordance with one embodiment. As shown, voxelization is performed. See operation 102.

In the context of the present description, voxelization refers to any technique of converting objects (e.g. geometric objects) from their geometric representation into a voxel or plurality of voxels that approximate the object. In this case, a voxel refers to any volume element which represents a value on a grid in three dimensional space. For example, each voxel may be a quantum unit of volume that has a numeric value (or values) associated with it that represents some measurable properties, independent variables, or attribute of an object or phenomenon. Further, a boundary attribute refers to any attribute of an object that is able to be linearly interpolated across a boundary of a polygon mesh. For example, in various optional embodiments, the boundary attribute may include a velocity, a color, a translucency, a density, a viscosity, a temperature, or any other physical property that may be required in a simulation (and for which linear interpolation produces the desired result).

As shown further, during the voxelization, a boundary attribute value is obtained from a polygon mesh. See operation 104. In the context of the present description, a polygon mesh refers to any collection of vertices and/or polygons (e.g. triangles, quadrilaterals, etc.) that define a shape of an object. In this case, an object refers to any figure, shape, collection of shapes (e.g. primitives), to which voxelization may be performed.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
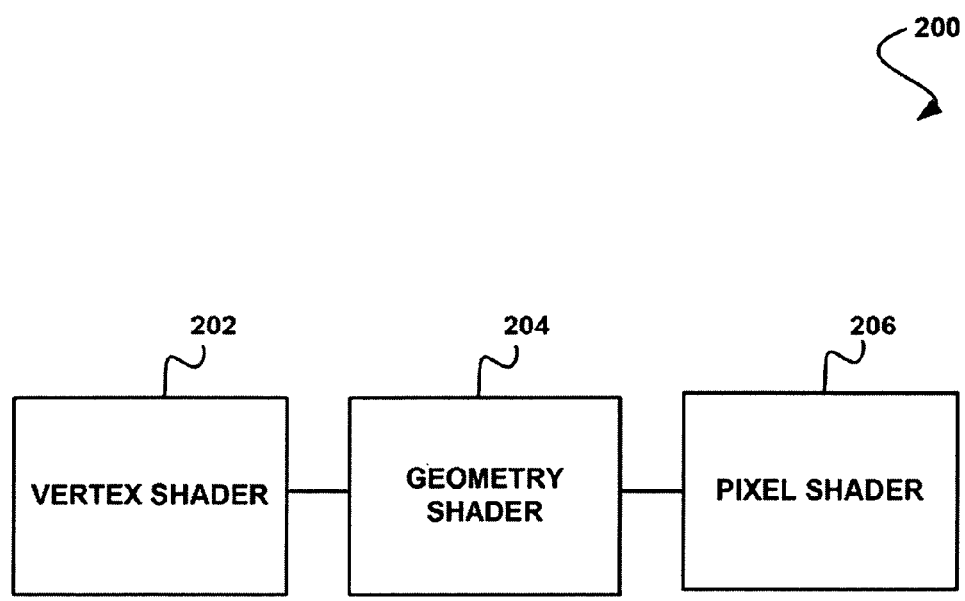
FIG. 2 shows a system for obtaining a boundary attribute value from a polygon mesh during voxelization, in accordance with one embodiment.

FIG. 2 shows a system 200 for obtaining a boundary attribute value from a polygon mesh during voxelization, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, a vertex shader 202, a geometry shader 204, and a pixel shader 206 are provided. In one embodiment, the shaders 202-206 may be included as part of a renderer which is capable of calculating a color of an object as part of a rendering process. In the context of the present description, rendering refers to any process of generating an image.

In operation, the vertex shader 202 may configure, modify, or compute a series of vertices in a mesh, including altering vertex properties such as position, color, texture coordinates, etc. In this case, the vertices computed or altered by the vertex shader 202 may be passed to the geometry shader 204. The geometry shader 204 may add and remove vertices from the mesh, for example. As an option, the geometry shader 204 may be used to procedurally generate geometry or to add volumetric detail to existing meshes that would be too costly to process on a central processing unit (CPU), for example. Still yet, the geometry shader 204 may further be equipped to support a method for obtaining a boundary attribute value from a polygon mesh during voxelization (see, for example, the method 100 of FIG. 1).

The pixel shader 206 may function to calculate the color value of individual pixels when the polygons (e.g. triangles, etc.) produced by the vertex and/or geometry shaders 202 and 204 are rasterized. As an option, the pixel shader 206 may be used for scene lighting and related effects such as bump mapping and color toning. In this way, the shaders 202-206 function as a pipeline stage implemented in graphics processing hardware.

As an example of the functionality of the system 200, a CPU may send instructions and geometry data to a graphics card or to a graphic processing unit (GPU). The vertex shader 202 may then transform the geometry and perform lighting calculations. Data may then pass to the geometry shader 204 where changes to the geometry may be made.

As an option, the calculated geometry may then be put in a triangle setup and triangles may be transformed into quads (e.g. 2×2 pixel primitives). The pixel shader 206 may then be applied to calculate the color value of individual pixels. Optionally, a visual test may be performed and the pixels may be written to a frame buffer. It should be noted that although the shaders 202-206 are illustrated as separate modules, the functionality of such modules may equally be combined into one module.

Figure 3:
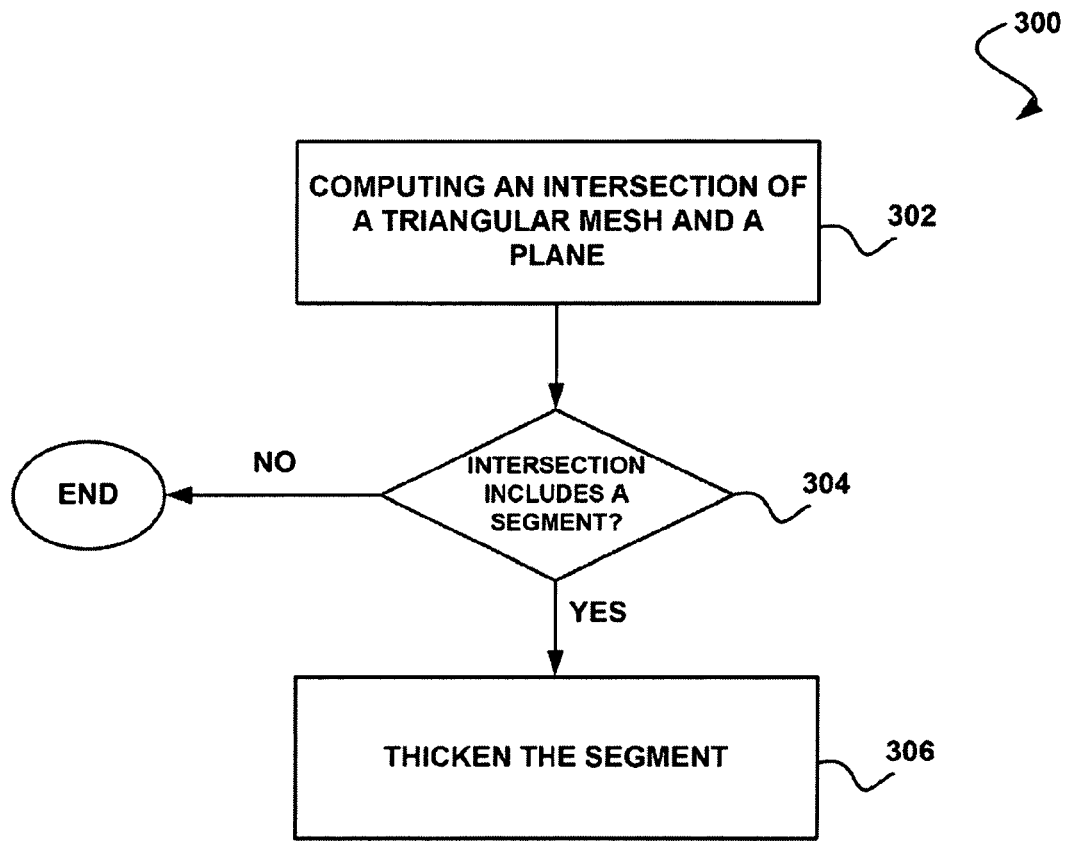
FIG. 3 shows a method for obtaining a boundary attribute value from a triangular mesh during voxelization, in accordance with another embodiment.

FIG. 3 shows a method 300 for obtaining a boundary attribute value from a triangular mesh during voxelization, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description. Further, in the context of the present description, a triangular mesh refers to any collection of vertices and/or triangles that define a shape of an object. It should be noted that, although the method 300 is described in the context of triangular meshes, any polygonal mesh may be utilized.

As shown, an intersection of a triangular mesh and a plane (i.e. a slice) is computed. See operation 302. In this case, the intersection may include at least one of a triangle (or other polygon), a segment, a point, and an empty set. It is then determined whether the intersection includes a segment. See operation 304. If it is determined that the intersection includes a segment, the segment is thickened. See operation 306. In other words, if the intersection includes a segment, a thickened version of the segment is drawn or rasterized into the plane (i.e. the slice).

If, for a given input triangle of the triangular mesh, it is determined that the triangle does not intersect that plane (e.g. by the geometry shader 204, etc.), no geometry is rasterized for the triangle. However, the triangular mesh may be rendered for each of a plurality of the planes, regardless of whether triangles intersect other planes. In other words, the triangular mesh may be rendered for a plurality of planes unconditionally. Subsequently, the vertices and triangles may be processed for each rendering instance (e.g. in the vertex shader 202 and the geometry shader 204). Finally, rasterization may occur for any triangle that intersects the plane in question.

As an option, the segment may be thickened utilizing a quad. In this case, a plurality of intersection points may be computed for being assigned to vertices of the quad. For example, the quad may include two endpoints of an original segment and two additional points offset from these endpoints. In one embodiment, the quad may be generated utilizing a geometry shader (e.g. the geometry shader 204, etc.).

Figure 3A:
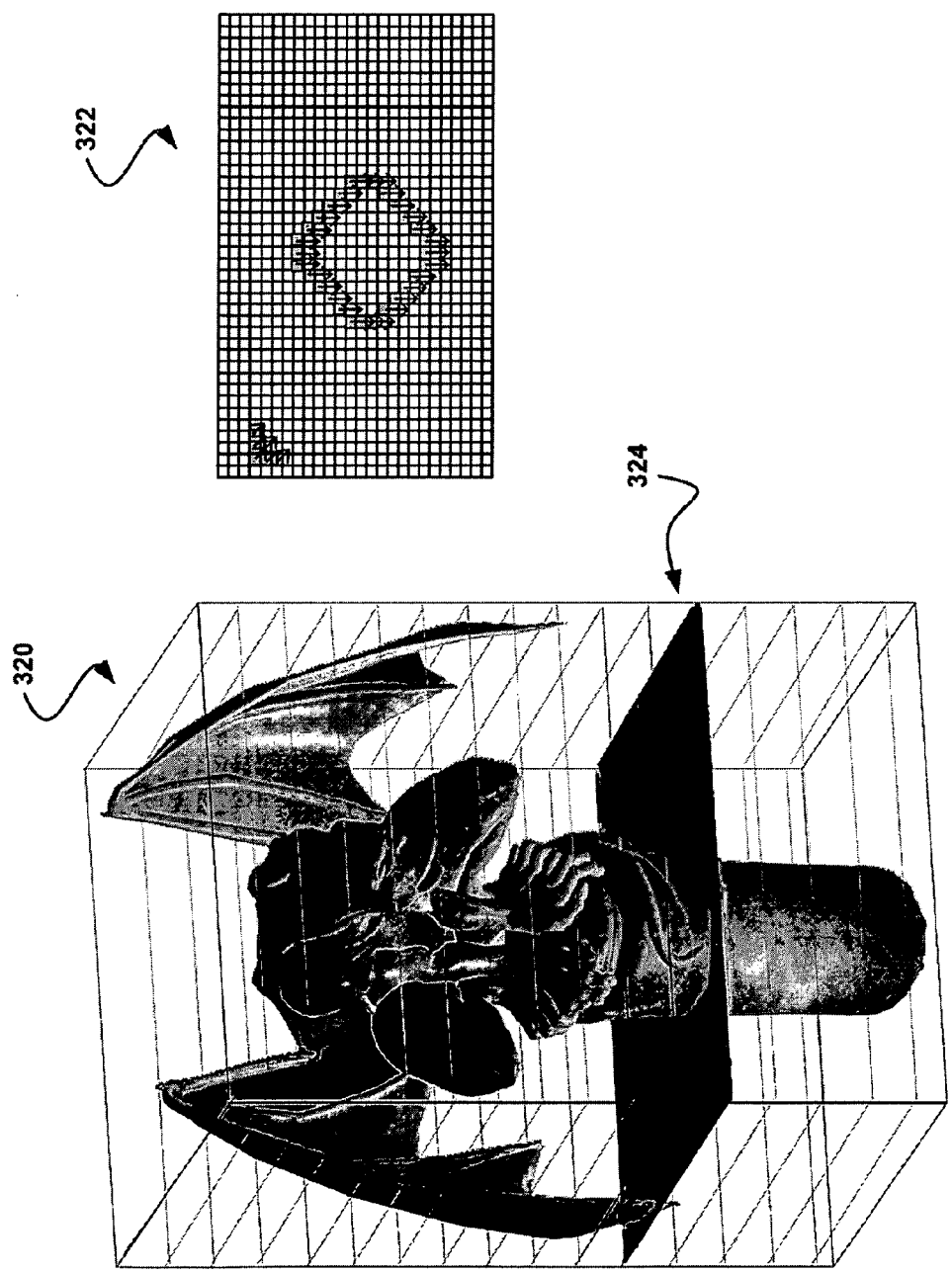
FIG. 3A shows an object and corresponding boundary attributes for a slice, such as velocity, in accordance with one embodiment.

As another option, the intersection points may be computed utilizing linear interpolation. In this way, the method 300 may be utilized to compute any interpolated per-vertex attributes, such as velocity, at each grid cell that contains part of a boundary for an object. FIG. 3A shows an object 320 and corresponding boundary attributes 322 (e.g. velocity) for a slice 324 in accordance with one embodiment.

As an example, attributes at each vertex of the slice 324 may be determined. In the case of velocity, one way to compute per-vertex velocities is to store vertex positions $p^{n-1}$ and $p^n$ from previous and current frames of data, respectively, in a vertex buffer. In this case, the instantaneous velocity $v_i$ of vertex i may be approximated with the forward difference illustrated in Equation 1. Such velocity may be computed in a vertex shader, for example.

$$v_i = \frac{p_i^n - p_i^{n+1}}{\Delta t} \qquad \text{Equation 1}$$

Figure 3B:
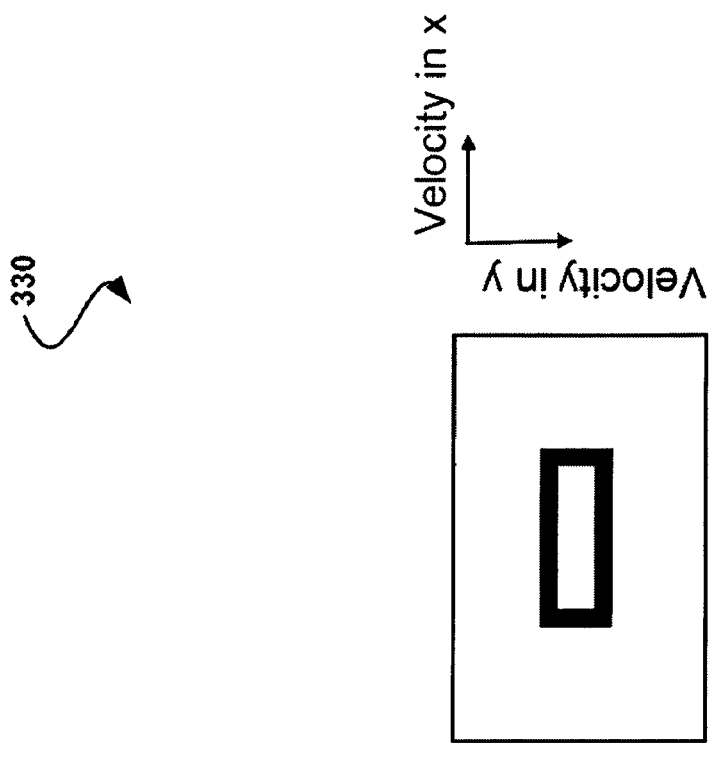
FIGS. 3B and 3C illustrate examples of an intersection of a triangle with a slice, in accordance with one embodiment.
Figure 3B:
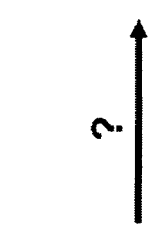
Figure 3B:
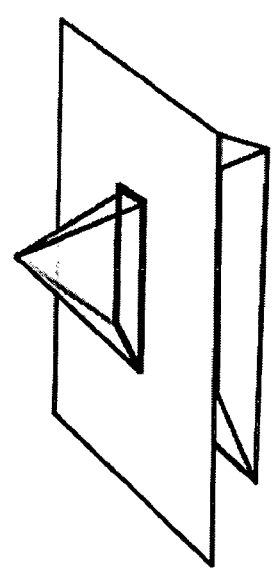
Figure 3C:
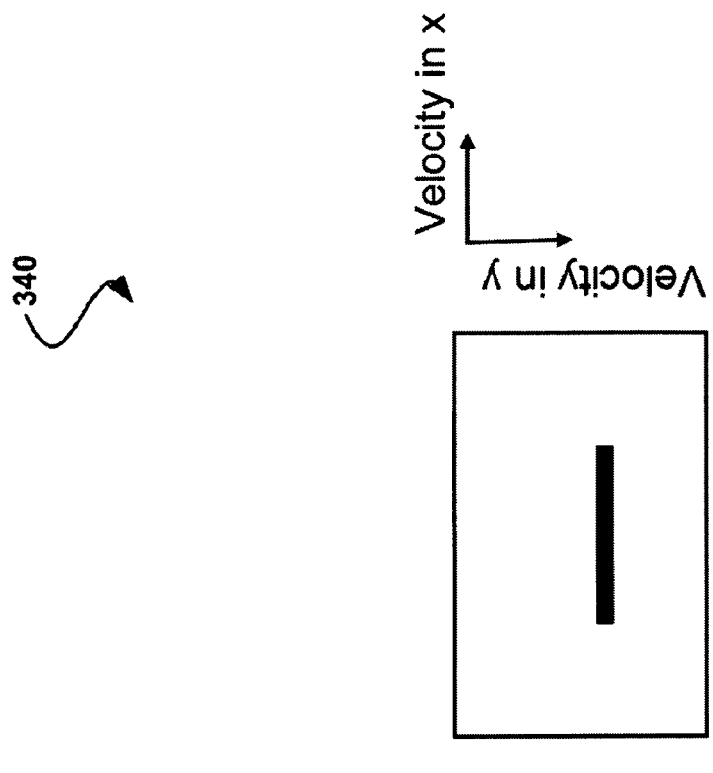
Figure 3C:
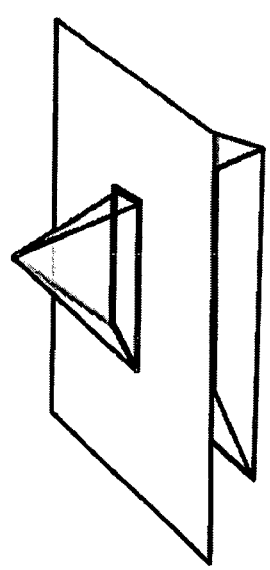

As an option, the triangular mesh may be rendered once for each slice of the grid. In this way, the intersection of each triangle with the current slice may be determined. FIGS. 3B and 3C illustrate examples 330 and 340 of an intersection of a triangle with a slice, in accordance with one embodiment. As noted above, the intersection between a slice and a triangle may be a triangle, a segment, a point, or an empty set.

Figure 3D:
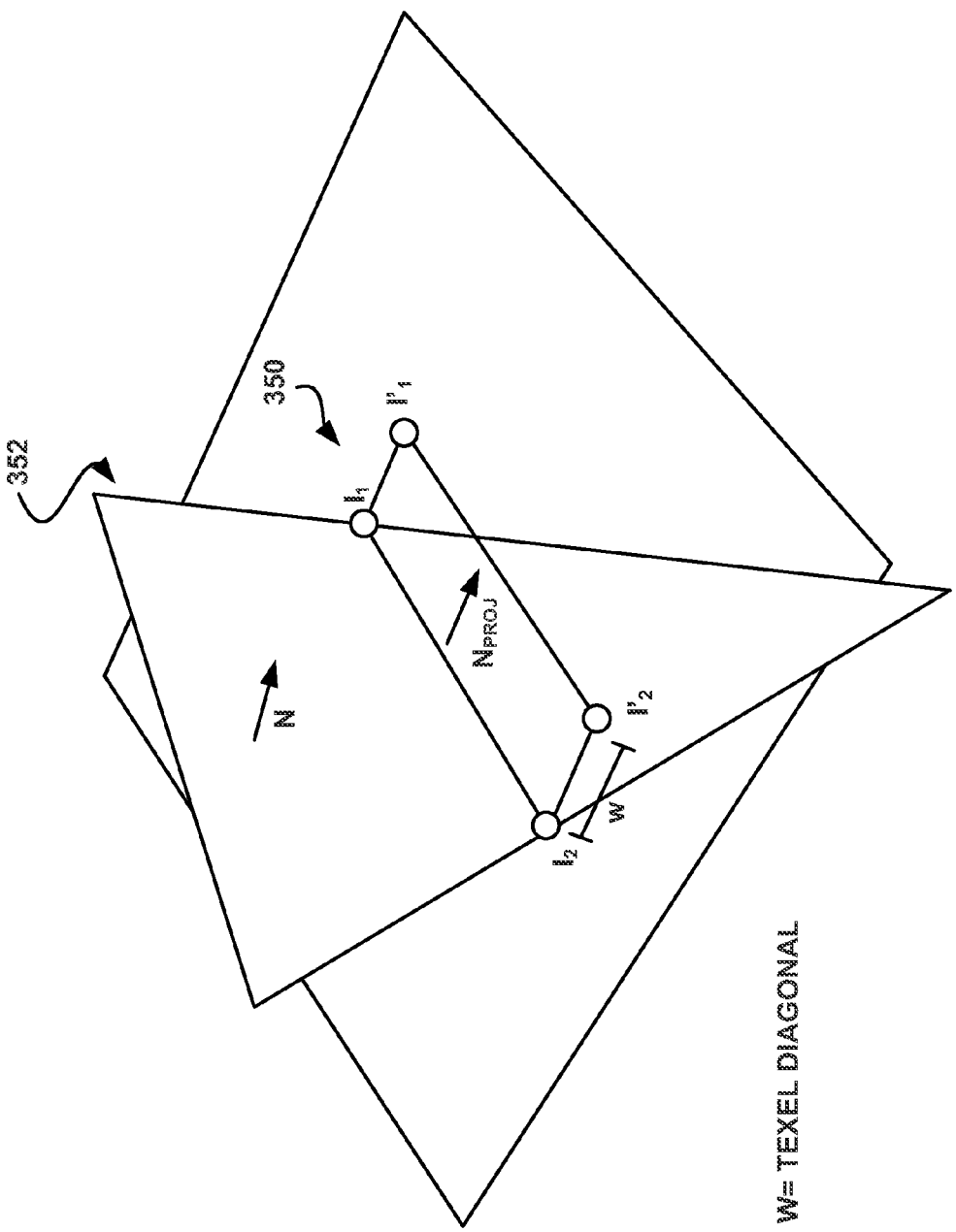
FIG. 3D shows a quad including two end points from a triangle along with two additional end points, in accordance with one embodiment.

If the intersection is a segment, a thickened version of the segment may be drawn into the slice using a quad (e.g. see FIG. 3C). This quad may include two endpoints of the original segment and two additional points offset from these endpoints. FIG. 3D shows a quad 350 including two end points ($I_1$ and $I_2$) from an original triangle 352 and two additional end points ($I'_1$ and $I'_2$) offset from the endpoints of the triangle, in accordance with one embodiment. As shown in FIG. 3D, the offset distance w is equal to the diagonal length of one texel in a slice of a 3D texture, and the offset direction is the projection of a normal vector of the triangle onto the slice. In this case, a texel refers to a fundamental unit of texture space.

In one embodiment, the quads may be generated using a geometry shader that operates on mesh triangles, producing four vertices if the intersection is a segment and zero vertices otherwise. Since geometry shaders do not generally output quads, a two-triangle strip may be utilized. To compute the triangle-slice intersection, each edge of a triangle may be intersected with the slice. If exactly two edge-slice intersections are found, the corresponding intersection points may be used as endpoints.

Using linear interpolation, the attribute values at each intersection point may be determined and assigned corresponding vertices of the quad. When the quad is rasterized or drawn, these values may be interpolated across the grid cells as desired. In one embodiment, a geometry shader may implement this functionality. One example of pseudo-code for implementing such functionality (e.g. with the geometry shader) is shown in Table 1.

TABLE 1

```
// GS_GEN_BOUNDARY_VELOCITY:
// takes as input:
//      - one triangle (3 vertices),
//      - the sliceIdx,
//      - the sliceZ;
// and outputs:
//      -2 triangles, if intersection of input triangle
// with slice is a segment
//      - 0 triangles, otherwise
// The 2 triangles form a 1-voxel wide quadrilateral
// along the segment
[maxvertexcount (4)]
void GS_GEN_BOUNDARY_VELOCITY(
    triangle VsGenVelOutput input[3],
    inout TriangleStream<GsGenVelOutput> triStream)
{
  GsGenVelOutput output;
  output.RTIndex = sliceIdx;
  float minZ = min( min(input[0].Pos-z,
input[1].Pos.z), input[2].Pos.z);
  float maxZ = max( max(input[0].Pos.z,
input[1]-Pos-z), input[2].Pos.z);
  if( (sliceZ < minZ) II (sliceZ > maxZ) )
```

TABLE 1-continued

```
        // this triangle does not intersect the slice
        return;
    GsGenVelIntVtx intersections[2];
    for( int i=0; i<2; i++ )
    {
        intersections[i].Pos = 0;
        intersections[i].Velocity = 0;
    }
    int idx = 0;
    if( idx < 2 )
        GetEdgePlaneIntersection(input[0], input[1],
sliceZ, intersections, idx);
    if( idx < 2 )
        GetEdgePlaneIntersection(input[1], input[2],
sliceZ, intersections, idx);
    if( idx < 2 )
        GetEdgePlaneIntersection(input[2], input[0],
sliceZ, intersections, idx);
    if ( idx < 2 )
        return;
    float sqrtOf2 = 1.414; // the diagonal of a pixel
    float2 normal = sqrtOf2 * normalize (
        cross( (input[1].Pos - input[0].Pos),
(input[2].Pos - input[0].Pos)).xy);
    for(int i=0; i<2; i++)
    {
        output.Pos = float4(intersections[ij-Pos, 0, 1);
        output.Velocity = intersections[i]-Velocity;
        triStream.Append( output );
        output.Pos = float4 ( (intersections[i].Pos +
(normal*projSpacePixDim)), 0, 1);
        output.Velocity = intersections[i].Velocity;
        triStream.Append( output );
    }
    triStream.RestartStrip( );
}
void GetEdgePlaneIntersection(
    VsGenVelOutput vA,
    VsGenVelOutput vB,
    float sliceZ,
    inout GsGenVelIntVtx intersections[2],
    inout int idx )
{
    float t = (sliceZ - vA.Pos.z) / (vB.Pos.z -
vA.Pos. z) ;
    if( (t < 0) || (t > 1) )
        // line-plane intersection is not within t
edge's end-points (A and B)
        return;
    intersections[idx].Pos = lerp(vA.Pos, vB.Pos,
t).xy;
    intersections[idx].Velocity = lerp(vA.Velocity
vB.Velocity, t);
    idx++;
}
```

Although, in some cases, voxelization utilizes a large number of draw or rasterization function calls, voxelization may be made more efficient using stream output. Stream output allows an entire buffer of transformed vertices to be cached when voxelizing deforming meshes such as skinned characters, rather than recomputing these transformations for each slice. Additionally, instancing may be used to draw all slices in a single draw call, rather than making a separate call for each slice. In this case, the instance identification may be used to specify the target slice.

In some cases, a low level of detail mesh may be used for each object. In this way, simplified models may allow objects to be voxelized at every frame with little performance cost. Further, in one embodiment voxelization may be pre-computed.

For example, if an object is transformed by a simple analytic transformation (e.g. versus a complex skinning operation), voxelization may be pre-computed and the inverse of the transformation may be applied whenever accessing the three-dimensional textures. One example of this is a mesh undergoing rigid translation and rotation. In this case, texture coordinates used to access inside-outside and object velocity textures may be multiplied by the inverse of the corresponding transformation matrix to determine the appropriate values. It should be noted that the preceding examples and pseudo-code are exemplary embodiments for obtaining a boundary attribute value from a triangular mesh during voxelization and should not be construed as limiting in any manner.

Figure 4:
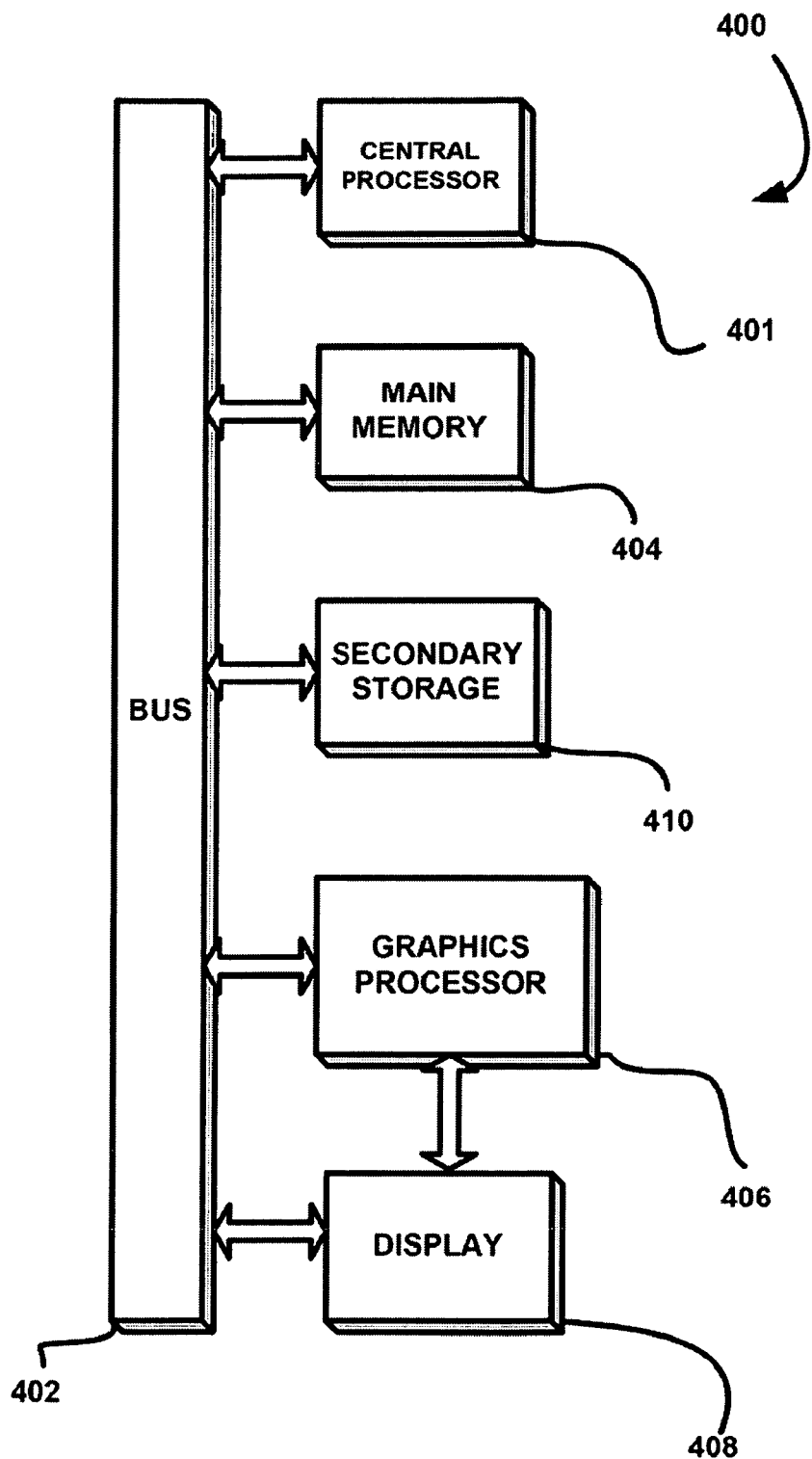
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
performing voxelization, utilizing a processor; and
during the voxelization, obtaining a boundary attribute value from a polygon mesh, the boundary attribute value including a value of a boundary attribute of an object that is capable of being linearly interpolated across a boundary of a polygon mesh;
wherein the boundary attribute includes at least one of velocity, color, translucency, density, viscosity, and temperature.

2. The method of claim 1, wherein the boundary attribute value is obtained by computing an intersection of the polygon mesh and a plane.

3. The method of claim 2, wherein the polygon mesh is rendered for each of a plurality of planes.

4. The method of claim 2, wherein the intersection includes at least one of a triangle, a segment, a point, and an empty set.

5. The method of claim 2, and further comprising determining if the intersection includes a segment.

6. The method of claim 5, wherein the segment is thickened if the intersection includes the segment.

7. The method of claim 6, wherein the segment is thickened utilizing a quad.

8. The method of claim 7, wherein the quad is generated utilizing a geometry shader.

9. The method of claim 7, wherein a plurality of intersection points are computed for being assigned to vertices of the quad.

10. The method of claim 9, wherein the intersection points are computed utilizing linear interpolation.

11. The method of claim 9, wherein the quad includes two endpoints of the segment and two additional points offset from the two endpoints of the segment, and the two additional points are offset in a direction of a projection of a normal vector onto the plane.

12. The method of claim 11, wherein the two additional points are offset at a distance equal to a diagonal length of one texel.

13. The method of claim 1, wherein the polygon mesh includes a triangular mesh.

14. The method of claim 1, wherein the boundary attribute value includes a velocity value.

15. The method of claim 14, wherein the velocity value is computed utilizing a plurality of positions from a previous frame of data stored in a vertex buffer, a plurality of positions from a current frame of data stored in a vertex buffer, and a change in time.

16. A computer program product embodied on a non-transitory computer readable medium, comprising:
computer code for performing voxelization; and
computer code for obtaining a boundary attribute value from a polygon mesh, during the voxelization, the boundary attribute value including a value of a boundary attribute of an object that is capable of being linearly interpolated across a boundary of a polygon mesh;
wherein the boundary attribute includes at least one of velocity, color, translucency, density, viscosity, and temperature.

17. The computer program product of claim 16, wherein the boundary attribute value is obtained by computing an intersection of the polygon mesh and a plane.

18. The computer program product of claim 17, wherein the polygon mesh is rendered for each of a plurality of planes.

19. The computer program product of claim 17, wherein the intersection includes at least one of a triangle, a segment, a point, and an empty set.

20. The computer program product of claim 17, and further comprising determining if the intersection includes a segment.

21. The computer program product of claim 20, wherein the segment is thickened if the intersection includes the segment.

22. An apparatus, comprising:
a processor for performing voxelization, and obtaining a boundary attribute value from a polygon mesh, during the voxelization, the boundary attribute value including a value of a boundary attribute of an object that is capable of being linearly interpolated across a boundary of a polygon mesh;
wherein the boundary attribute includes at least one of velocity, color, translucency, density, viscosity, and temperature.

23. The apparatus of claim 22, wherein the processor remains in communication with memory and a display via a bus.

* * * * *